S. ARNOLD.
Clothes Wringer.
No. 201,902.  Patented April 2, 1878.
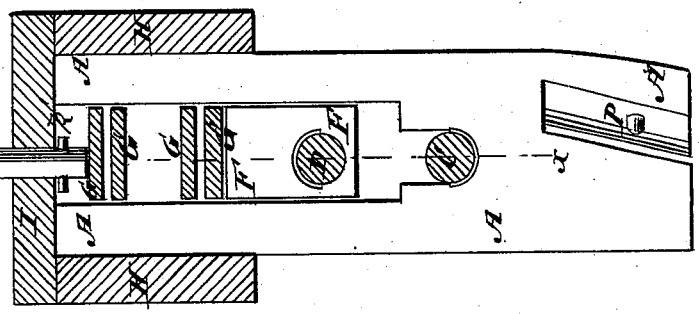
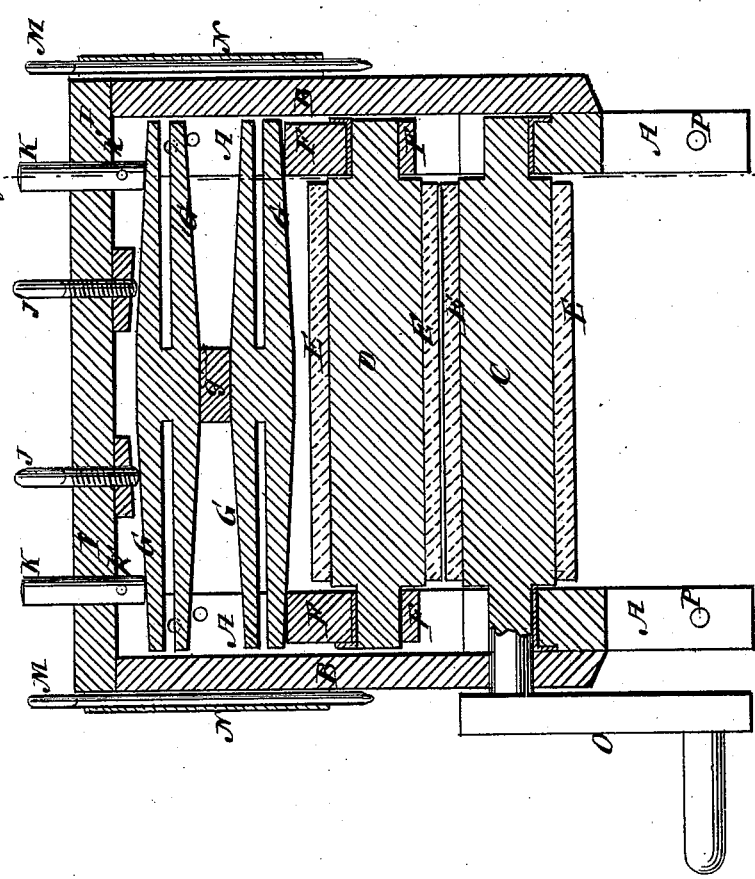
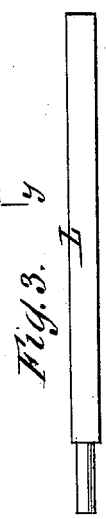
WITNESSES:
E. Wolff
J. H. Scarborough
INVENTOR:
S. Arnold.
BY Munn & Co
ATTORNEYS.

UNITED STATES PATENT OFFICE.

SAMUEL ARNOLD, OF SILVER SPRINGS, TENNESSEE.

IMPROVEMENT IN CLOTHES-WRINGERS.

Specification forming part of Letters Patent No. 201,902, dated April 2, 1878; application filed October 6, 1877.

*To all whom it may concern:*

Be it known that I, SAMUEL ARNOLD, of Silver Springs, in the county of Wilson and State of Tennessee, have invented a new and useful Improvement in Clothes-Wringers, of which the following is a specification:

Figure 1 is a vertical longitudinal section of my improved wringer, taken through the line *x x*, Fig. 2. Fig. 2 is a vertical cross-section of the same, taken through the line *y y*, Fig. 1. Fig. 3 is a detail view of the lever for applying pressure.

Similar letters of reference indicate corresponding parts.

The object of this invention is to furnish an improved clothes-wringer which shall be simple in construction, convenient in use, not liable to get out of order, easily repaired, and which may be readily adjusted to give any desired amount of pressure to the clothes.

The invention will first be described in connection with the drawing, and then pointed out in the claims.

A A are the standards of the wringer, which are slotted from their upper ends to receive the journals of the rollers and the ends of the spring, and to the outer sides of which are attached boards B, which cover the slots and the ends of the said rollers and spring. C is the lower roller, and D is the upper roller, which rollers may be made of hard maple, or of other suitable hard wood.

The journals of the rollers C D may be formed upon the ends of the said rollers, or they may be the ends of an iron rod passed through the center of, and secured to, the said rollers. The rollers C D are covered with rubber tubes E, of suitable thickness, the hole through which is made one-eighth of an inch less in diameter than the rollers C D, upon which they are placed. The surface of the rollers C D and the inner surface of the rubbers E are moistened with rubber cement or other adhesive mixture, which, in connection with the elasticity of the rubber, holds the said rubber securely in place, and makes the connection between the rubbers and rollers so firm that it is as easy to make a separation through the body of the rubber as between the rubber and rollers.

In case the rubber should become loose, white-metal tacks may be driven through it and into the rollers C D, so that their heads may be sunk beneath the surface of said rubber, and which will hold the rubber securely in place.

The journals of the lower roller C E revolve in recesses in the standards A, at the lower ends of their slots, which recesses are lined with metal to prevent wear. The journals of the upper roller D E revolve in holes in the bearing-blocks F, which holes are lined upon the upper side to prevent wear. The blocks F slide up and down in the slots of the standards A, and upon their upper ends rest the ends of the lower part of the quadruple spring G. The spring G is formed of two bars of cedar, attached at their centers to the upper and lower sides of a block, *g'*, by bolts or screws. The bars of the spring G are slotted longitudinally from their ends to, or nearly to, the block *g'*, to give them greater elasticity.

By this construction, should the spring G become set or have its elasticity impaired, its parts may be detached from the block *g'*, and may be reversed, and they will be as good as new. To the side edges of the upper parts of the standards A are attached boards H, and to the upper ends of the said standards is attached a top board, I, so that the spring G will be wholly incased.

J J are two eyebolts, which are screwed into the top board I at a little distance from its center. K are two pins, which are placed in holes in the end parts of the top board I, with their lower ends resting upon the top part of the spring G near its ends, and which are kept from being drawn out by small cross-pins *k'*, which are passed through them at the lower side of the top board I.

To put the rollers under pressure for work, the end of the lever L is passed through the eye of one of the eyebolts J, so as to rest upon the upper end of one of the push-pins K. The outer end of the lever L is then pressed downward, so as to force the pin K, and thus the end of the upper part of the spring G, downward, and an iron pin, M, is passed through a hole in the side boards H and standard A above the said end of the spring G. The other end of the spring G is then forced down and secured in the same way.

Several holes are formed in the side boards

H and standards A, to receive the pressure-pins M, so that the rollers can be put under a greater or less pressure, as may be desired.

When the wringer is not in use, the pins M are kept in pockets or keepers N, attached to the outer sides of the end boards B.

One of the journals of the lower roller C E projects, and to it is attached the crank O, by which the said roller C E is revolved, the upper roller D E being revolved by friction. The lower ends of the standards A are slotted to receive the side of a tub or suds-box, or of a rest attached to and extending across said tub or box, where they are secured by hand-screws P, passing in through the outer edges of the said standards. The latter arrangement adapts the wringer to be used as a washing-machine, the clothes being taken out of the suds in one part of the tub and passed through the wringer into the suds at the other side of the said tub. By passing the clothes back and forth through the wringer in this way for a few times they will be thoroughly washed.

Having thus described my invention, I claim as new and desire to secure by Letters Patent—

1. In a clothes-wringer, the wooden spring G, formed of two bars, attached at the center to the opposite sides of a block, $g'$, each bar being slotted to form forks or double plates at each end, and thus made reversible, as and for the purpose described.

2. The combination of the eyebolts J, the push-pins K, the lever L, and the pins M with the top board I, the spring G, the slotted and perforated standards A, the bearing-blocks F, and the rollers C E D E, substantially as herein shown and described.

SAMUEL ARNOLD.

Witnesses:
W. A. McCLAIN,
WM. ARNOLD.